(12) United States Patent
Contasti

(10) Patent No.: US 7,805,894 B2
(45) Date of Patent: Oct. 5, 2010

(54) CONSTRUCTION CONNECTORS INCORPORATING HARDWARE

(76) Inventor: Andrew Contasti, 1411 Derringer Rd., Poway, CA (US) 92064

( * ) Notice: Subject to any disclaimer, the term of this patent is extended or adjusted under 35 U.S.C. 154(b) by 255 days.

(21) Appl. No.: 11/608,646

(22) Filed: Dec. 8, 2006

(65) Prior Publication Data

US 2008/0134620 A1    Jun. 12, 2008

(51) Int. Cl.
*E04B 1/00*    (2006.01)
(52) U.S. Cl. .................... 52/98; 52/99; 52/712; 52/713; 411/461
(58) Field of Classification Search .............. 52/712, 52/713, 98, 99; 411/999, 461
See application file for complete search history.

(56) References Cited

U.S. PATENT DOCUMENTS

| | | | | |
|---|---|---|---|---|
| 3,498,171 A | * | 3/1970 | Jureit | 411/466 |
| 3,742,557 A | * | 7/1973 | Francois | 24/33 B |
| 4,002,001 A | * | 1/1977 | Uydess | 52/731.5 |
| D259,242 S | * | 5/1981 | Gilb | D8/373 |
| 4,330,971 A | * | 5/1982 | Auberger | 52/210 |
| 4,480,941 A | * | 11/1984 | Gilb et al. | 403/232.1 |
| 4,529,161 A | * | 7/1985 | Lockwood, Sr. | 248/549 |
| 4,771,593 A | * | 9/1988 | Lee | 56/295 |
| 4,896,985 A | * | 1/1990 | Commins | 403/11 |
| 5,065,558 A | * | 11/1991 | Boatsman | 52/239 |
| 5,101,078 A | * | 3/1992 | Yang | 174/482 |
| 5,104,252 A | * | 4/1992 | Colonias et al. | 403/232.1 |
| 5,109,646 A | * | 5/1992 | Colonias et al. | 52/712 |
| 5,110,247 A | * | 5/1992 | Losada | 411/441 |
| 5,178,503 A | * | 1/1993 | Losada | 411/441 |
| 5,890,837 A | * | 4/1999 | Wells | 405/43 |
| 5,924,830 A | * | 7/1999 | De Groot | 411/458 |
| 6,158,774 A | * | 12/2000 | Mink | 280/801.1 |
| 6,174,119 B1 | * | 1/2001 | Orr | 411/461 |
| 2003/0226412 A1 | * | 12/2003 | Rumminger et al. | 73/866.5 |
| 2008/0119891 A1 | * | 5/2008 | Miles et al. | 606/213 |

OTHER PUBLICATIONS

Simpson Strong-Tie™, "Wood Construction Connectors C-2005," *Catalog C-2005*, Effective Jan. 1, 2005 Expires Dec. 21, 2005, www.strongtie.com.
Simpson Strong-Tie™, "Wood Construction Connectors C-2008," *Catalog C-2008*, Effective Jan. 1, 2008 Expires Dec. 31, 2008, www.strongtie.com.

\* cited by examiner

*Primary Examiner*—David Dunn
*Assistant Examiner*—Joshua Ihezie
(74) *Attorney, Agent, or Firm*—Fish & Richardson P.C.

(57) ABSTRACT

A construction connector incorporating one or more fasteners can be formed by a plate including a plurality of openings, at least one fastener aligned with a corresponding opening in the plate and oriented substantially perpendicular to the plate, and a breakable connection coupling the fastener to the plate. The breakable connection further can comprise a weld. A second fastener also can be aligned with a second corresponding opening in the plate such that it is oriented substantially perpendicular to the plate, and a breakable connection can be used to couple the second fastener to the plate. Additionally, a second plate can be coupled to the plate, wherein the second plate includes at least one opening.

17 Claims, 9 Drawing Sheets

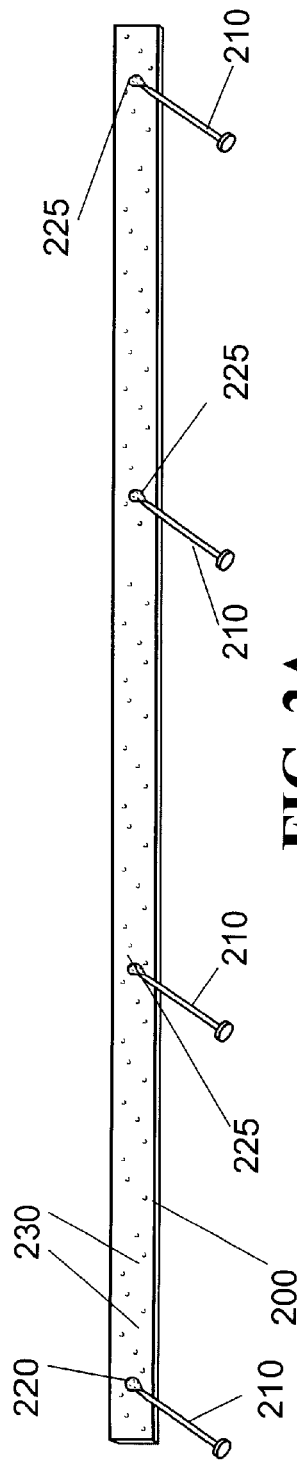
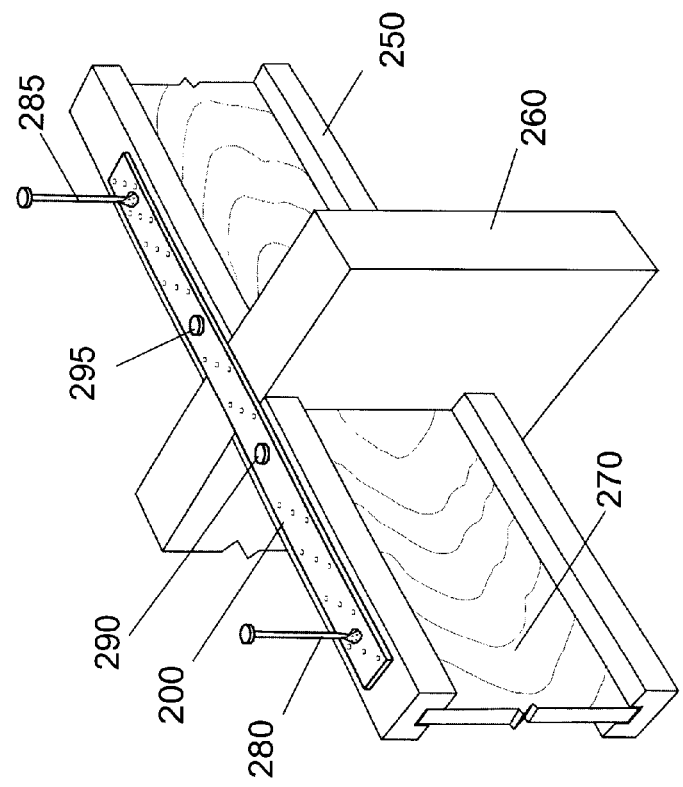
FIG. 2A
FIG. 2B

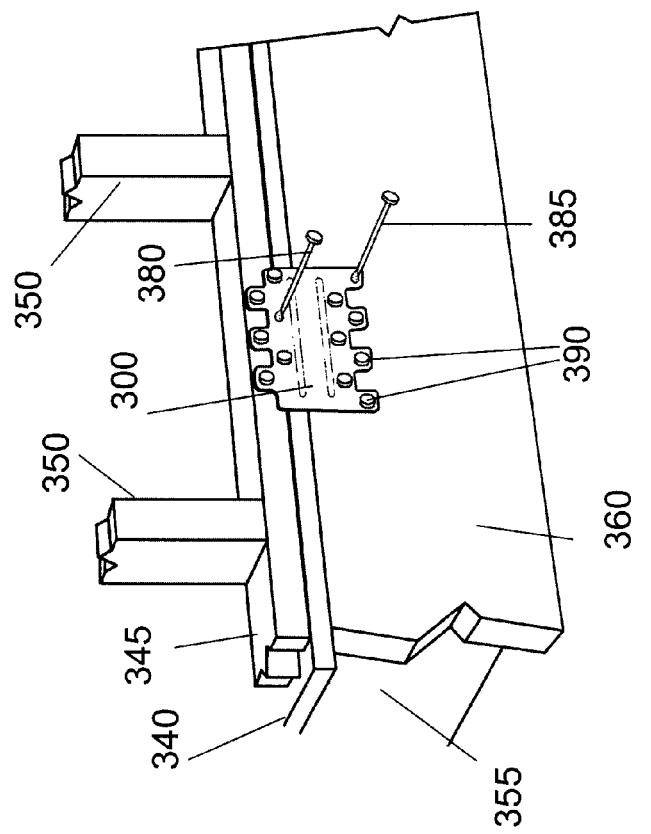
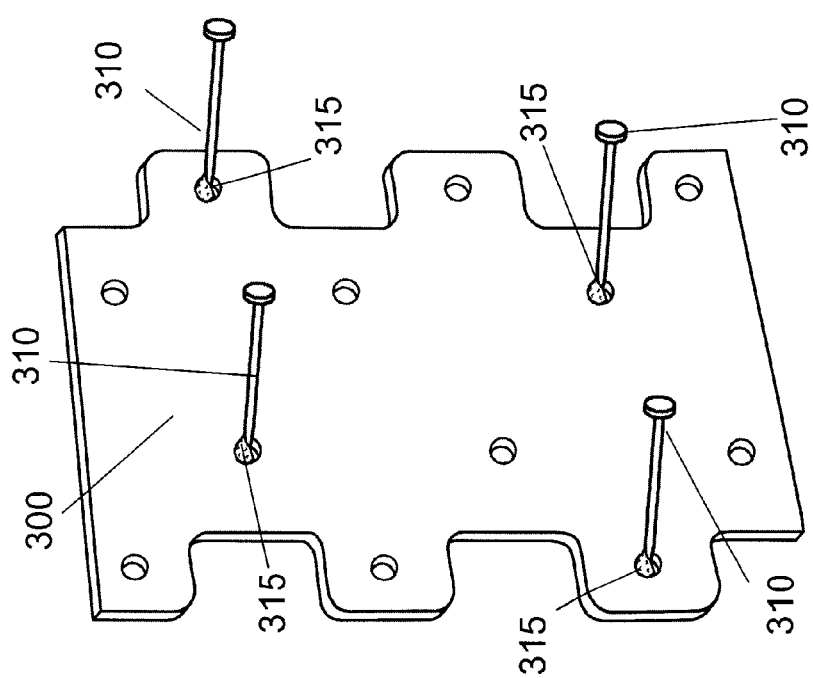
FIG. 3B
FIG. 3A

CONSTRUCTION CONNECTORS INCORPORATING HARDWARE

BACKGROUND

The present disclosure relates to building construction connectors incorporating fasteners; for example, a joist hanger with nails affixed to the joist hanger.

Frame construction is a method of constructing buildings. Frame construction provides a stable frame to which interior and exterior wall coverings, floors, roofs, and ceilings are attached. Frame construction is based around various structural members including, studs, joists, headers, beams, plywood, or other structural members. The structural members are joined together to create the frame. The structural members can be made of wood, laminates, metal, or other materials.

The structural members of a frame construction can been joined using nails, screws, bolts, or other fasteners. FIG. 1 depicts a frame construction 100. The frame construction 100 can be used to create a wall in a building. The frame construction 100 consists of a stud 110, additional studs 120, a header 130, and a sole plate 140. The stud 110 and the header 130 meet at the joint 150. The structural integrity of the frame construction 100 is dependent upon the strength of the joint 150 as well as other joints. The stronger the joint 150 is, the strong frame construction 100 is. The stud 110 and the header 130 can be joined using nails. A nail 160 can be pushed or hammered through the stud 110 and the header 130 to form a rigidly fixed connection to the joint 150. Multiple nails can be hammered through a joint to reinforce the connection. Likewise, other structural members can be joined using nails. Other types of fasteners, such as screws or bolts can also be used.

During the assembly of a frame construction, construction workers hold the various structural members in place while nails are used to form the joints. For example, to form the joint 150, one worker would hold the stud 110 against the header 130, and would place the nail 160 against the stud 110 with one hand and strike the nail 160 with the other hand. Alternatively, another construction worker can use a pneumatic nail gun to insert the nail 160 to form the joint 150. Thus forming a single joint can require the labor of two constructions workers at a time.

More recently, frame constructions are reinforced or supplemented using metal construction connectors. As shown in FIGS. 2A-6B, a strap tie 200, a lateral tie plate 300, a seismic-hurricane tie 400, a joist hanger 500, and an angle plate 600 are examples of construction connectors. Construction connectors can be used to form the joints between structural members of a frame construction or to connect smaller sections of a frame construction to make a larger frame construction or for structural values. For example, construction connectors can be used to connect a roof to walls of a building or to connect the walls to a foundation or floor of a building, or walls to upper floors. Construction connectors can be made out of metal or other materials.

Construction connectors provide structural advantages for frame construction using only nails or screws. Construction connectors enhance stiffness and sturdiness of a frame construction. Construction connectors also improve the accuracy of the construction because structural members are less likely to move during assembly. Construction connectors also reduce the likelihood that a structural member will be split during assembly and need to be replaced. Presently, pneumatic nail guns are not compatible with the use of construction connectors.

During the assembly of a frame construction using construction connectors, a construction worker holds a construction connector against a first structural member while loose nails or screws are used to fasten the construction connector against a structural member. Then the construction workers holds the fastened construction connector, with the first structural member attached, against a second structural member and aligns the two structural members. Building regulations specify different fasteners depending on the type of connector, the load that connection is required to support, i.e. its load rating, and the type of connection. The construction worker then locates the correct nail or fastener for that connection and, using the construction worker's other hand, the construction worker drives the fastener through the openings in the connector and into the structural members. Various apparatuses can also be used to hold the structural members and the construction connector in place while a single construction worker connects them. But the apparatuses require time to setup. Some pneumatic equipment is available to apply the fasteners using the construction connectors, but they do not perform reliably and require additional equipment and infrastructure to work.

SUMMARY

The present inventor recognized the need to reduce the quantity of labor required to assemble frame construction buildings and to simplify the assembling of structural members using construction connectors. Accordingly, the techniques and apparatus described here implement construction connectors incorporating fasteners that simplify the assembly process and reduces the labor required.

In general, in one aspect, the techniques can be implemented to include a plate including a plurality of openings; an at least one fastener aligned with a corresponding opening in the plate and oriented substantially perpendicular to the plate; and a breakable connection coupling the at least one fastener to the plate. Further, the techniques can be implemented such that the breakable connection comprises a weld. Further, the techniques can be implemented such that the at least one fastener comprises: one of a nail, a screw, a peg, a bolt, or a pin. Further, the techniques can be implemented such that the plate comprises: one of a metal, a plastic, graphite, or a composite. Further, the techniques can be implemented such that the at least one of the plurality of openings comprises a beveled opening. Further, the techniques can be implemented such that the plate further comprises: a construction connector.

Additionally, the techniques can be implemented to include a second plate coupled to the plate, wherein the second plate includes at least one opening. Further, the techniques can be implemented such that the second plate is aligned substantially perpendicular to the plate. Further, the techniques can be implemented such that the second plate is flexibly coupled. Additionally, the techniques can be implemented to include a second fastener, wherein the second fastener is aligned with the at least one opening in the second plate and oriented substantially perpendicular to the second plate; and a breakable connection coupling the second fastener to the second plate. Additionally, the techniques can be implemented to include a second fastener, wherein the second fastener is aligned with the at least one opening in the second plate and oriented at an angle of between 30 degrees to 60 degrees to the second plate; and a breakable connection coupling the second fastener to the second plate.

Additionally, the techniques can be implemented to include a second fastener aligned with a second corresponding opening in the plate and oriented substantially perpendicular to the plate; and a breakable connection coupling the second fastener to the plate. Further, the techniques can be implemented such that the breakable connection comprises a sleeve.

In general, in another aspect, the techniques can be implemented to include aligning a plate and a structural member; and securing the plate to the structural member by applying a force to an at least one fastener breakably connected to the plate. Additionally, the techniques can be implemented to include aligning the plate to a second structural member; and further securing the plate to the structural member by applying a force to a second fastener breakably connected to the plate. Additionally, the techniques can be implemented to include aligning a second plate, which is coupled to the plate, to a second structural member; and further securing the plate to the structural member by applying a force to a second fastener breakably connected to the second plate.

In general, in another aspect, the techniques can be implemented to include aligning a fastener with an opening in a plate, wherein the fastener is oriented substantially perpendicular to the plate; and forming a breakable connection between the fastener and the plate. Further, the techniques can be implemented such that the forming a breakable connection comprises forming a weld between the fastener and the plate. Additionally, the techniques can be implemented to include coupling a second plate to the plate.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 2A presents a strap tie incorporating fasteners.
FIG. 2B presents a strap tie incorporating fasteners connected to structural members.
FIG. 3A presents a lateral tie plate incorporating fasteners.
FIG. 3B presents a lateral tie plate incorporating fasteners connected to structural members.

DETAILED DESCRIPTION

Figure 1:
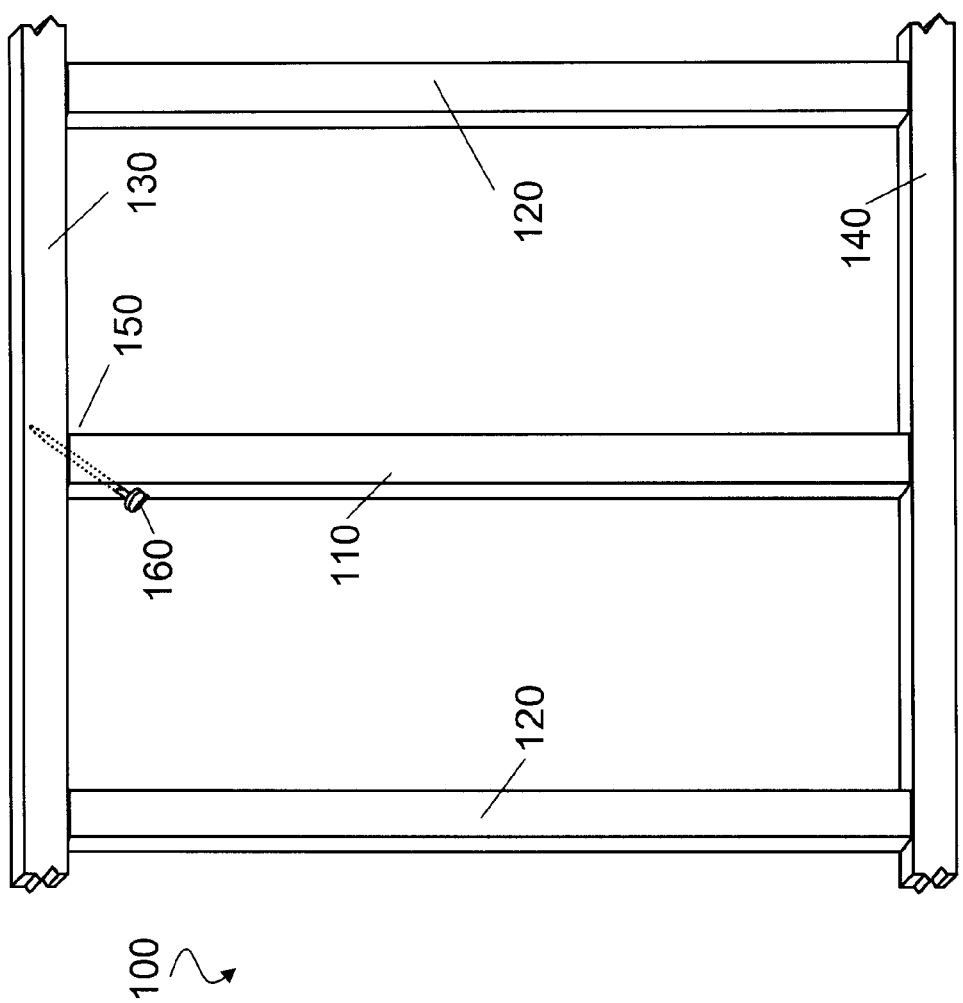
FIG. 1 depicts a frame construction.

FIG. 2A presents a strap tie 200. The strap tie 200 comprises a single plate that can be used to form a connection between structural members. The strap tie 200 also can be used to connect a frame construction to another portion of a structure, such as a second frame construction, a foundation, or a roof. The strap tie 200 can be made of a variety of materials, including metal, plastic, a composite, or other such materials. Further, the strap tie 200 can be rigid, semi-rigid, or flexible. One or more indentations, such as indentations 230, can be added to the strap tie 200 to provide additional friction when the strap tie 200 is installed. The strap tie 200 also can have one or more holes, such as the first hole 220 proximally positioned at the end of the strap tie 200, or holes 225. The one or more holes can be distributed along the length of the strap tie 200, such as along the central axis. Further, a fastener 210, such as a nail, can be secured substantially perpendicular, for example, within 30 degrees from perpendicular, to the strap tie 200 such that the point of the fastener 210 does not extend beyond the opposite side of the strap tie 200. Further, the connection securing the fastener 210 to the strap tie 200 can be breakable upon the application of force. For example, the fastener 210 can be secured to the strap tie 200 using a tack weld that can be broken by a force applied to a portion of the fastener 210, such as a nail head.

In another implementation, the fastener 210 can be secured to the strap tie 200 using other means, such as an adhesive, a compression fitting, or friction. The fastener 210 can be secured such that the fastener 210 does not separate from the strap tie 200 during movement, including shipping and positioning, but can be separated from the strap tie 200 upon the application of force, such as a hammer blow.

FIG. 2B depicts a strap tie partially installed. A first joist 250 and a second joist 270 intersect a beam 260. The strap tie 200 can be fastened to the first joist 250 and the second joist 270 to maintain a constant alignment with the beam 260. The strap tie 200 can be aligned with the first joint 250 and the second joist 270 such that it transects the beam 260, as shown in FIG. 2B. Further, the strap tie 200 can include a fastener 280 that can be oriented substantially perpendicular to the strap tie 200 and which has previously been secured to the strap tie 200. The strap tie 200 can be secured to the second joist 270 by applying sufficient force to the fastener 280 to break the connection securing the fastener 280 to the strap tie 200 and to drive the fastener 280 at least partially into the second joist 270. A second fastener 285 secured to the strap tie 200 can be similarly used to secure the strap tie 200 to the first joist 250. Additional fasteners, such as fasteners 290 and 295, also can be secured to the strap tie 200 using a breakable connection. Alternatively, additional fasteners can be driven through the strap tie 200, such as through one or more openings, once the strap tie 200 has been secured to one or more structural members.

FIG. 3A depicts a lateral tie plate 300 that can be used to form a connection between two or more structural members. For example, the lateral tie plate 300 can be used to connect a frame construction to a foundation or a roof. Further, the lateral tie plate 300 also can be used to transfer sheer forces from one structural member to another. The lateral tie plate 300 comprises a single plate forming a planar surface. The lateral tie plate 300 can be comprised of a variety of materials, including metal, plastic, a composite, or other such durable material. The lateral tie plate 300 also can include one or more openings, such as the holes 315. The one or more holes 315 can be positioned in various locations across the surface of the lateral tie plate 300. A fastener 310 can be secured to the lateral tie plate 300 in a substantially perpendicular orientation, such that a point of the fastener 310 is aligned with a hole in the surface of the lateral tie plate 300. Further, the fastener 310 can be positioned such that the point does not extend beyond the opposite surface of the lateral tie plate 300. Additionally, the connection securing the fastener 310 to the lateral tie plate 300 can be breakable upon the application of sufficient force, such as a hammer blow. The fastener 310 can be breakably connected to the lateral tie plate 300 using a weld, an adhesive, a compression fitting, friction, or by other such severable means.

FIG. 3B depicts a lateral tie plate 300 partially installed. A bottom plate 345 sits atop of a subflooring 340. Studs 350 can be nailed into the bottom plate 345 to form a portion of a framed wall. A joist 355 supports the subflooring 340. The subflooring 340 can be nailed to the joist 355 to secure it. A header 360 abuts the joist 355. The joist 355 and the header 360 can be nailed together to secure the joist 355. The bottom plate 345 can be nailed together with the joist 355 and the header 360 through the subflooring 340. Further, the lateral tie plate 300 can include a fastener 380 that is oriented substantially perpendicular to the lateral tie plate 300 and which has previously been secured to the later tie plate 300.

It can be important to secure the relative locations of the bottom plate 345, the subflooring 340 relative to the joist 355 and the header 360. Sheering forces and other loads can dislodge the bottom plate 345 or the subflooring 340 and present structural problems for the frame and the building. The installation of the lateral tie plate 300 can help secure the bottom plate 345 and the subflooring 340. The lateral tie plate 300 can be secured to the bottom plate 345 by applying sufficient force to the fastener 380 to break the connection securing the fastener 380 to lateral tie plate 300 and to drive the fastener 380 at least partially into the bottom plate 345. Similarly, the lateral tie plate 300 can be secured to the header 360 by applying sufficient force to the fastener 385 to break the connection securing the fastener 350 to lateral tie plate 300 and to drive the fastener 385 at least partially into the header 360. Additional fasteners, such as fasteners 390, also can be secured to the lateral tie plate 300 using a breakable connection. Alternatively, additional fasteners can be driven through the lateral tie plate 300, such as through one or more openings, once the lateral tie plate 300 has been secured to one or more structural members.

Figure 4B:
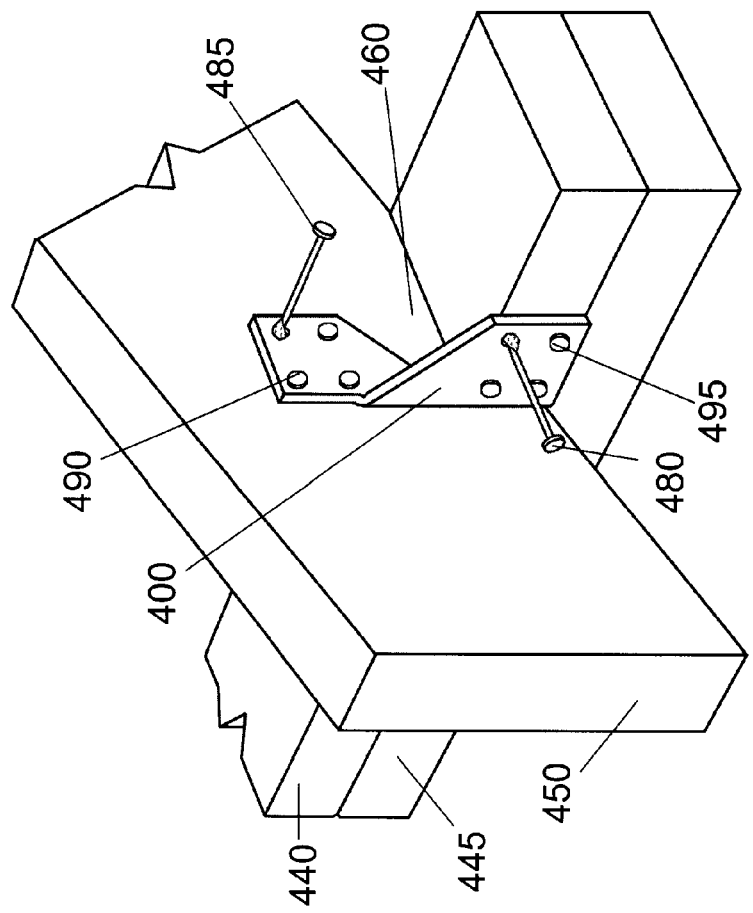
FIG. 4B presents a seismic-hurricane tie incorporating fasteners connected to structural members.
Figure 4A:
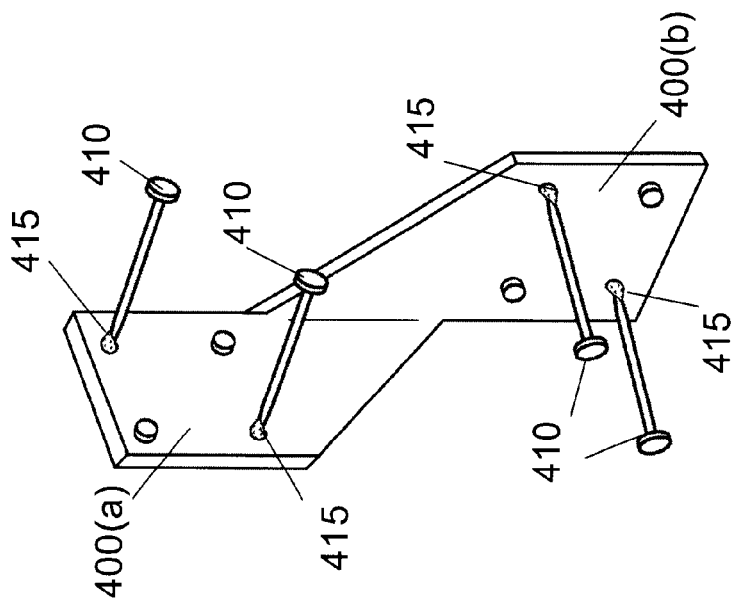
FIG. 4A presents a seismic-hurricane tie incorporating fasteners.

FIG. 4A depicts a seismic-hurricane tie 400. The seismic-hurricane tie 400 can be used to form a connection between structural members and can also be used to connect a frame construction to a foundation or roof. The seismic-hurricane tie 400 comprises a first plate 400(a) and a second plate 400(b) substantially perpendicular to each other and coupled to one another as displayed in FIG. 4A. The first plate 400(a) and the second plate 400(b) can be made from a single unitary piece of material by bending or mold, or can be made from separate pieces that are welded, glued, or bonded together. The seismic-hurricane tie 400 can be made of a variety of materials, including metals, plastics, a composite, or other such materials. Further, the seismic-hurricane tie 400 can be rigid, semi-rigid, or flexible. The seismic-hurricane tie 400 also can have one or more openings, such as the holes 415 located in various positions on the seismic-hurricane tie 400. The one or more holes can be distributed in various patterns along the length and width of the seismic-hurricane tie 400. Further, fastener 410, such as a nail, can be secured substantially perpendicular to the seismic-hurricane tie 400 such that the point of the fastener 410 does not extend beyond the opposite side of the seismic-hurricane tie 400. Further, the connection securing the fastener 410 to the seismic-hurricane tie 400 can be breakable. For example, the fastener 410 can be secured to the seismic-hurricane tie 400 using a weld that can be broken by a force applied to a portion of the fastener 410, such as a nail head. In another implementation, the fastener 410 can be breakably connected to the seismic-hurricane tie 400, using an adhesive, a compression fitting, or friction. The fastener 410 can be breakably connected such that the fastener 410 does not separate from seismic-hurricane tie 400 during movement, including shipping and position, but can be separated from seismic-hurricane tie 400 upon the application of force, such as a hammer blow.

FIG. 4B depicts a seismic-hurricane tie 400 partially installed. A rafter 450 sits on top of an upper top plate 440, which sits on top of a lower top plate 445. The rafter 450 can be used to form the roof of a building, while the upper top plate 440 and the lower top plate 445 can form the top of a wall. The rafter 450 can have a notch 460 so that the rafter 450 can sit squarely on the upper top plate 440. Further, the seismic-hurricane tie 400 can include a fastener 480 that is oriented substantially perpendicular to the seismic-hurricane tie 400 and which has previously been secured to the seismic-hurricane tie 400. It can be important to secure the relative location of the rafter 450 to the upper top plate 440. While the downward force supplied by gravity from the weight of the rafter 450 onto the upper top plate 440 can supply some of the security during normal operation of the building and toe nailing the rafter 450 to the top plate 440 can supply additional security, seismic and hurricane forces can apply strong lateral and lifting forces that require additional reinforcement.

The installation of the seismic-hurricane tie 400 can help secure the rafter 450 to the upper top plate 440. The seismic-hurricane tie 400 can be secured to the rafter 450 by applying sufficient force to the fastener 485 to break the connection securing the fastener 485 to the seismic-hurricane tie 400 and to drive the fastener 485 at least partially into the rafter 450. A second fastener 490 secured to the seismic-hurricane tie 400 can be similarly used to secure the seismic-hurricane tie 400 to the top plate 440. Additional fasteners, such as fasteners 490 and 495, also can be secured to the seismic-hurricane tie 400 using a breakable connection. Alternatively, additional fasteners can be driven through the seismic-hurricane tie 400, such as through one or more openings, once the seismic-hurricane tie 400 has been secured to one or more structural members.

Figure 5B:
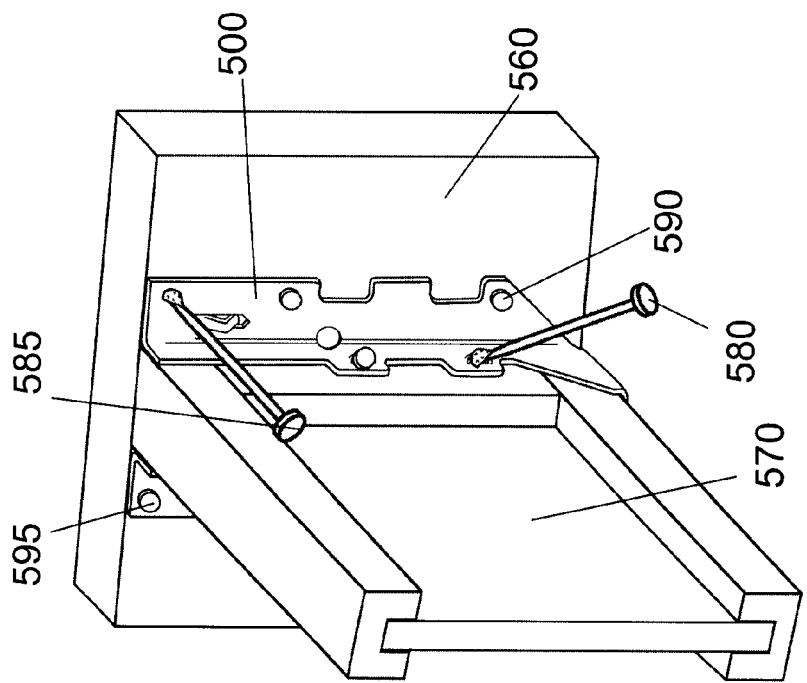
FIG. 5B depicts a joist hanger incorporating fasteners connected to structural members.
Figure 5A:
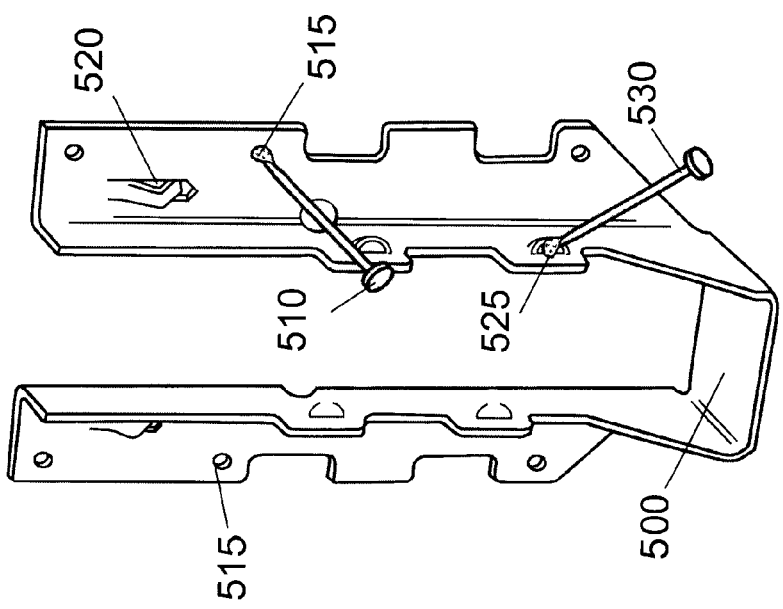
FIG. 5A depicts a joist hanger incorporating fasteners.

FIG. 5A presents joist hanger 500. The joist hanger 500 can be used to form a connection between structural members. The joist hanger 500 comprises several plates, some perpendicular to each other, and coupled to one another as displayed in FIG. 5A. The joist hanger 500 can be made of a variety of materials, including metals, plastics, a composite or other such materials. Further, the joist hanger 500 can be rigid, semi-rigid, or flexible. The joist hanger 500 can also have one or more openings, including a hole 515 located in various positions on the joist hanger 500. The holes 515 can be distributed in various patterns along the length and width of joist hanger 500. The holes 525 can also be angled at 45 degrees to the surface of the joist hanger 500. The joist hanger 500 can also comprise joist hanger nails 520 that can be made of the same material as joist hanger 500 and can be made from one of the plates of material in the joist hanger 500. But joist hanger nails 520 are not load bearing. A fastener 510 can be tack welded substantially perpendicular to the joist hanger 500 such that the point of fastener 510 does not extend beyond the opposite side of the joist hanger 500. Similarly, a fastener 530 can be tack welded substantially within 45 degrees to the joist hanger 500 such that the point of fastener 530 does not extend beyond the opposite side of the joist hanger 500. Further, the connection securing the fastener 510 to the joist hanger 500 can be breakable upon the application of force. For example, the fastener 510 can be breakably connected to the joist hanger 500 using a weld that can be broken by a force applied to a portion of the fastener 510, such as a nail head. In another implementation, the fastener 510 can be breakably connected to the joist hanger 500 using other means, such as a weld, an adhesive, a compression fitting, or friction.

FIG. 5B presents a joist hanger 500 partially installed. A joist 570 abuts a header 560 to make a T-shaped framing structure. The joist 570 can be toe nailed or end nailed to the header 560. The header 560 can also be a beam in a more complex framing structure than that depicted in FIG. 5B. The joist 570 and the header 560 can be used to support flooring in a building. It can be important to secure the relative location of the header 560 to the joist 570, for example, to support any load applied by a floor.

The installation of the joist hanger 500 can help secure the joist 570 to header 560 and can enable the framing structure created by the joist 570 and the header 560 to support an increased load. The joist hanger 500 can include a fastener 580 that is oriented substantially perpendicular to the joist hanger 500 and which has previously been secured to the joist hanger 500. The joist hanger 500 can be secured to the joist 570 by applying sufficient force to the fastener 580 to break the connection securing the fastener 580 to the joist hanger 500 and to drive the fastener 580 at least partially into the joist 570. A second fastener 585 secured to the joist hanger 500 can be similarly used to secure the joist hanger 500 to the header 560. Additional fasteners, such as fasteners 590 and 595, also can be secured to the joist hanger 500 using a breakable connection. Alternatively, additional fasteners can be driven through the joist hanger 500, such as through one or more openings, once the joist hanger 500 has been secured to one or more structural members.

Figure 6B:
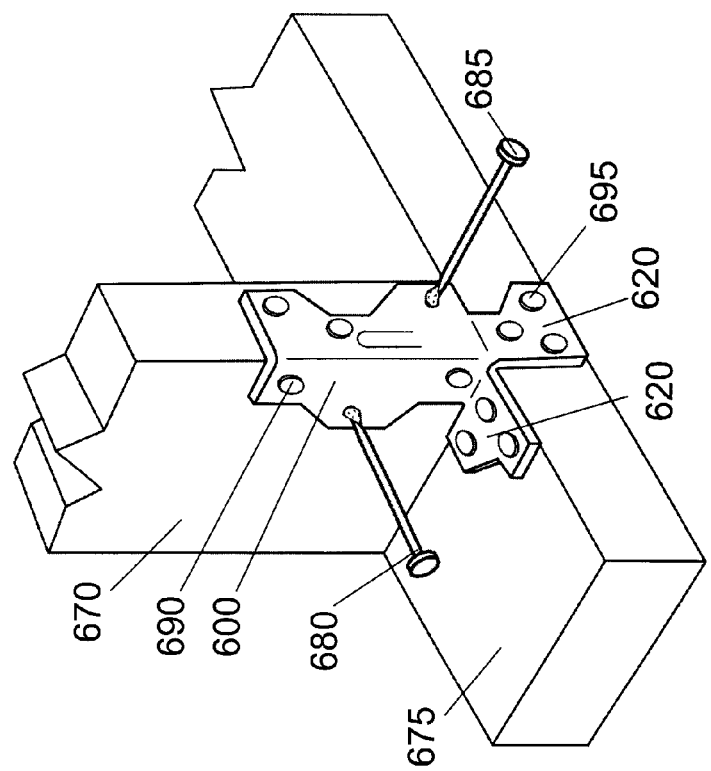
FIG. 6B presents an angle plate incorporating fasteners connected to structural members.
Figure 6A:
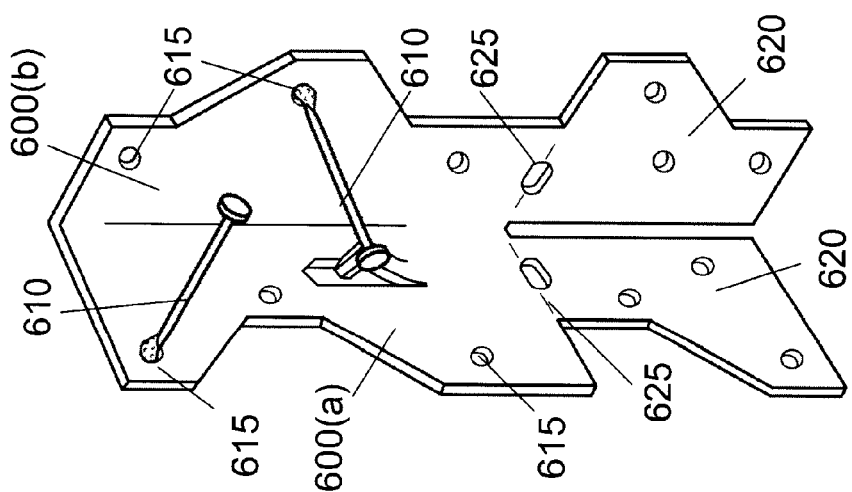
FIG. 6A presents an angle plate incorporating fasteners.

FIG. 6A presents angle plate 600. The angle plate 600 can be used to form a connection between structural members. The angle plate 600 comprises a first plate 600(a) and a second plate 600(b) substantially perpendicular to each other and coupled to one another as displayed in FIG. 6A. The first plate 600(a) and the second plate 600(b) can be made from a single unitary piece of material by bending or mold, or can be made from separate pieces that are welded, glued, or bonded together. The angle plate 600 can be made of a variety of materials, including metals, plastics, or other such materials. Further the angle plate 600 can be rigid, semi-rigid, or flexible. The angle plate 600 can be comprised of one or more openings, including hole 615, located in various positions on the angle plate 600. The hole 615 can be distributed in various patterns along the length and width of the angle plate 600. Fastener 610 can be welded substantially perpendicular to the angle plate 600 through the hole 615 such that the point of fastener 610 does not extend beyond the opposite side of angle plate 600. Further, the connection securing fastener 610 to angle plate 600 can be broken upon the application of force. For example, fastener 610 can be breakably connected to the angle plate 600 using a weld that can be broken by a force applied to a portion of the fastener 610, such as a nail head. In another implementation, the fastener 610 can be breakably connected to the angle plate 600 by other means, such as an adhesive, a compression fitting, or friction. The angle plate 600 can have bendable plates 620 that are flexibly coupled to angle plate 600 and can be bent along bend lines 625. The bendable plates 620 allow the angle plate 600 to secure a variety of connections.

FIG. 6B presents an angle plate 600 partially installed. A bottom plate 675 abuts stud 670 to form a T-shaped framing structure. The stud 670 can be toe nailed or end nailed to the bottom plate 675. The stud 670 and the bottom plate 675 can be the part of a wall. It can be important to secure the relative location of the stud 670 to the bottom plate 675. The installation of the angle plate 600 can help secure the stud 670 to the bottom plate 675 and enable the framing structure created by the stud 670 and the bottom plate 675 to support an increased load.

The angle plate 600 can include a fastener 680 that is oriented substantially perpendicular to the angle plate 600 and which has previously been secured to the angle plate 600. The angle plate 600 can be secured to the stud 670 by applying sufficient force to the fastener 680 to break the connection securing the fastener 680 to the angle plate 600 and to drive the fastener 680 at least partially into the stud 670. A second fastener 685 secured to the angle plate 600 can be similarly used to secure the angle plate 600 to the stud 670. Bendable legs 620 can be bent and then secured to bottom plate 675. Additional fasteners, such as fasteners 690 and 695, also can be secured to the angle plate 600 using a breakable connection. Alternatively, additional fasteners can be driven through the angle plate 600, such as through one or more openings, once the angle plate 600 has been secured to one or more structural members.

Figure 7:
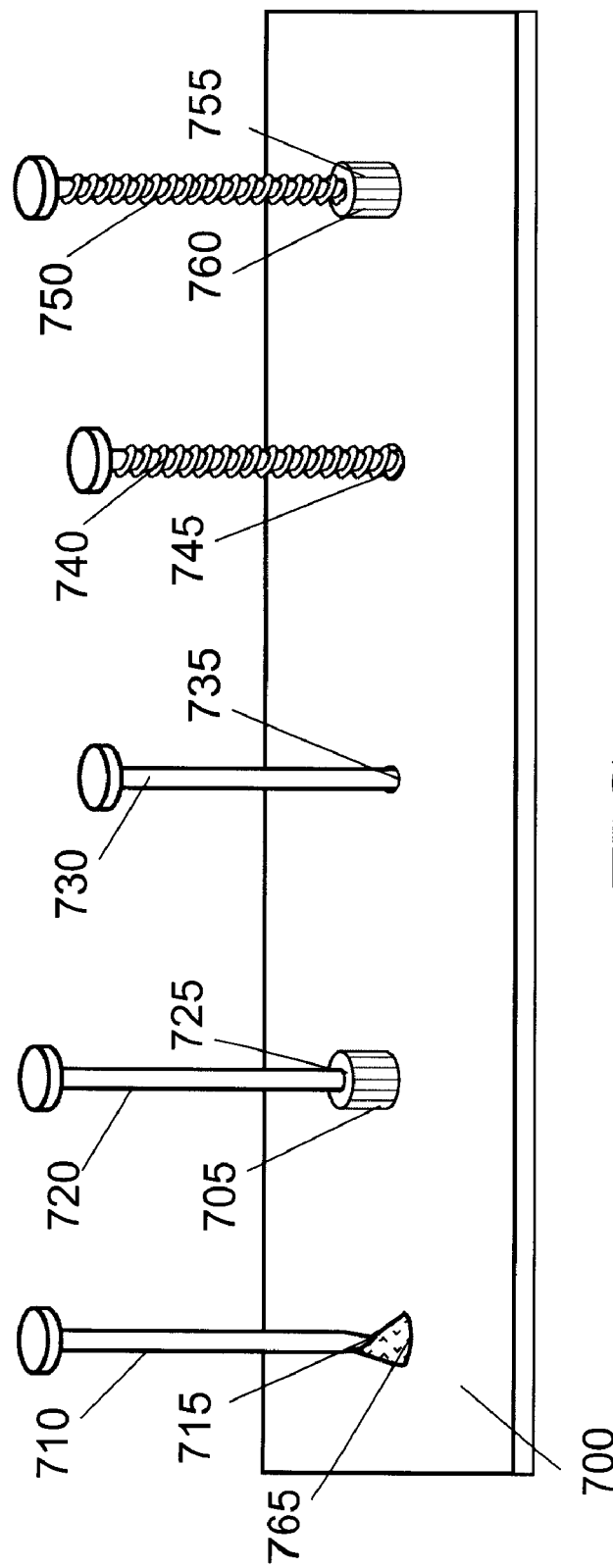
FIG. 7 depicts various techniques to incorporate fasteners to a construction connector.

FIG. 7 depicts various techniques to secure fasteners to a plate 700. The plate 700 consists of a single plate. Plate 700 can be made of a variety of materials, including metals, plastics, composites or other such materials. Further, the plate 700 can be rigid, semi-rigid, or flexible. The plate 700 can have openings, such as a hole 705 and a hole 765. The plate 700 can incorporate various types of fasteners, such as a nail 710, a nail 720, a nail 730, a screw 740, and a screw 750. The nail 710 can be breakably connected to the plate 700 by a tack weld 715. The nail 710 can be positioned substantially perpendicular to the plate 700 or at a shallow angle to the plate 700. The point of the nail 710 can fit through the hole 765 to be flush with the opposite side of the plate 700 or protrude slightly. Further, the tack weld 715 can be breakable upon the application of force to the nail 710. The tack weld 715 can be sufficiently strong such that the nail 710 does not separate from the plate 700 during movement, including shipping and positioning, but can be separated from the plate 700 upon the application of force, such as a hammer blow.

The nail 720 can be breakably connected to the plate 700 by sleeve 725. The nail 720 can be positioned substantially perpendicular to the plate 700 or at a shallow angle to the plate 700. The point of nail 720 can be flush with the opposite side of the plate 700 or protrude slightly. The sleeve 725 can be made of hard plastic, rubber, or other such material. The sleeve 725 can have an inner diameter small enough to grip the nail 720 using friction. Similarly, the sleeve 725 can have an outer diameter large enough to fit tightly into a hole 705 in the plate 700. Sleeve 725 can be strong enough such that the nail 720 does not separate from the plate 700 during movement, including shipping and position, but can be separated from the plate 700 upon the application of force, such as a hammer blow. The sleeve 725 can be made of a brittle hard plastic that fractures when hit with the force of a typical hammer hit and breaks away from the plate 700 and the nail 720. In another implementation, the sleeve 725 can be made of rubber that compresses when the head of the nail 720 is forced flush with the plate 700.

The nail 730 can be breakably connected to the plate 700 by a friction fit hole 735. The nail 730 can be positioned substantially perpendicular to the plate 700 or at a shallow angle to the plate 700. The point of the nail 730 can be flush with the opposite side of the plate 700 or protrude slightly. The friction fit hole 735 can have an inner diameter that is identical to or slightly larger than the outer diameter of the nail 730, such that the nail 730 is held in the friction fit hole 735. The friction between the nail 730 and the friction fit hole 735 can be great enough such that the nail 730 does not separate from the plate 700 during movement, including shipping and position, but can be separated from the plate 700 upon the application of force, such as a hammer blow.

The screw 740 can be breakably connected to the plate 700 by a friction fit hole 745. The screw 740 can be positioned perpendicular to the plate 700 or at a shallow angle to the plate 700. The point of the screw 740 can be flush with the opposite side of the plate 700 or protrude slightly. The friction fit hole 745 can have an inner diameter that is identical to or slightly larger than the outer diameter of the screw 740, such that the screw 740 is held in the friction fit hole 745. The friction between the screw 740 and the friction fit hole 745 can be great enough such that the screw 740 does not separate from the plate 700 during movement, including shipping and position, but can be separated from the plate 700 upon the application of force, such as the pressure or torque applied by a screwdriver or power drill. In another implementation, the hole 745 can be threaded to accommodate the screw 740.

The screw 750 can be breakably connected to the plate 700 by a sleeve 755. The screw 750 can be positioned substantially perpendicular to the plate 700 or at a shallow angle to the plate 700. The point of the screw 750 can fit through the hole 760 to be flush with the opposite side of the plate 700 or protrude slightly. The sleeve 755 can be made of hard plastic, rubber, or other such material. The sleeve 755 can have an inner diameter small enough to grip the screw 750 with friction. Similarly, the sleeve 755 can have an outer diameter large enough to fit tightly into an opening in the plate 700.

The sleeve 755 can be strong enough such that the screw 750 does not separate from the plate 700 during movement, including shipping and position, but is separable from the plate 700 upon the application of force, such as the pressure or torque applied by a screwdriver or power drill. The sleeve 755 can be made of a brittle hard plastic that fractures and breaks away from the plate 700 and the nail 755 when the pressure or torque of a screwdriver or power drill is applied. In another implementation, the sleeve 755 can be made of rubber that compresses when the head of the screw 750 is forced flush with the plate 700.

Figure 8:
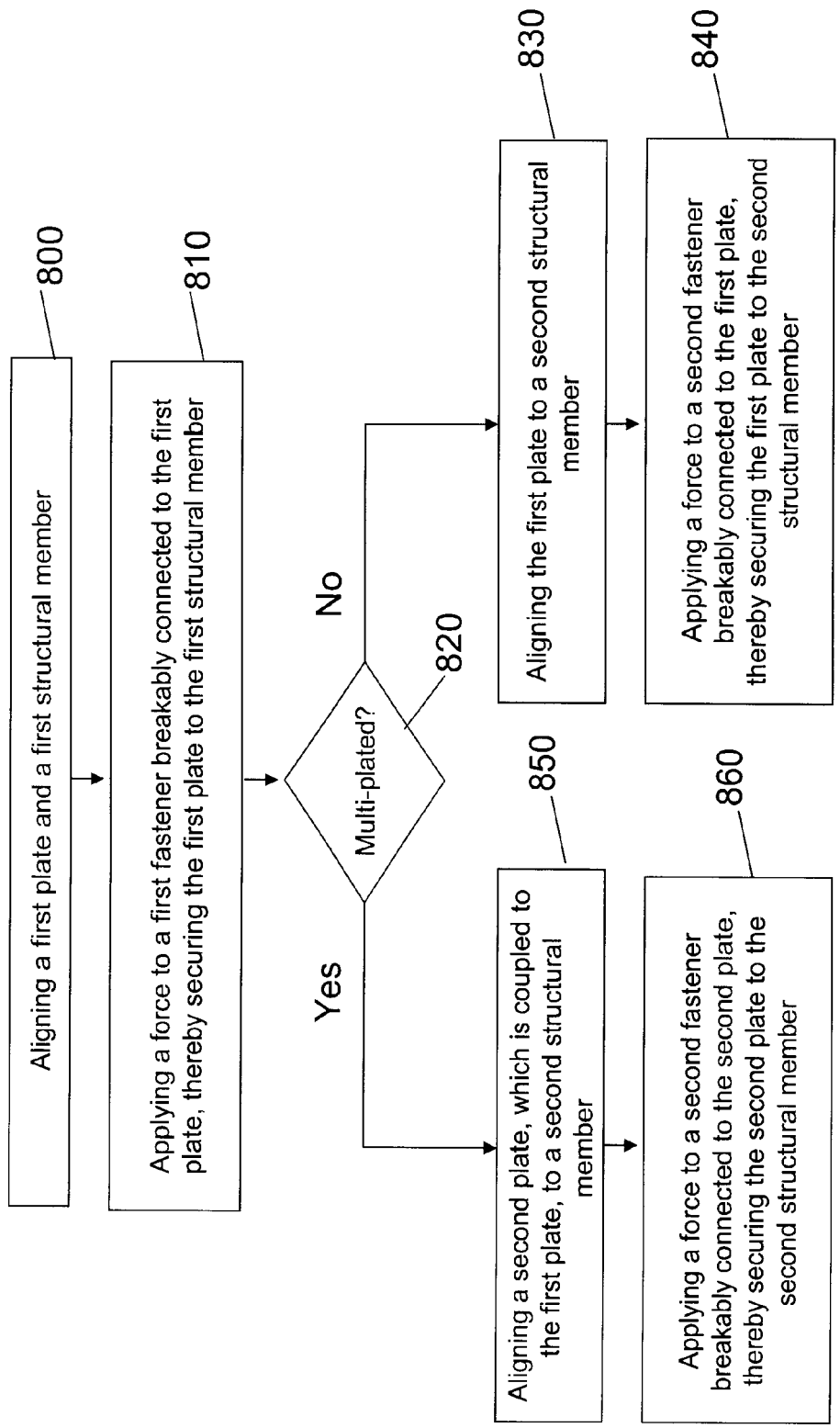
FIG. 8 describes a method for installing a construction connector with breakably connected fasteners.

FIG. 8 describes a method for installing a construction connector including breakably connected fasteners. A first plate and a first structural member are aligned (800). A force is applied to a first fastener breakably connected to the first plate, thereby securing the first plate to the first structural member (810). It can be determined whether the construction connector comprises more than one plate (820). If the construction connector comprises one plate, the first plate can be aligned with a second structural member (830). A force can be applied to a second fastener breakably connected to the first plate, thereby securing the first plate to the second structural member (840). If the construction connector comprises more than one plate, a second plate coupled to the first plate can be aligned with a second structural member (850). A force can be applied to a second fastener breakably connected to the second plate, thereby securing the second plate to the second structural member (860).

Figure 9:
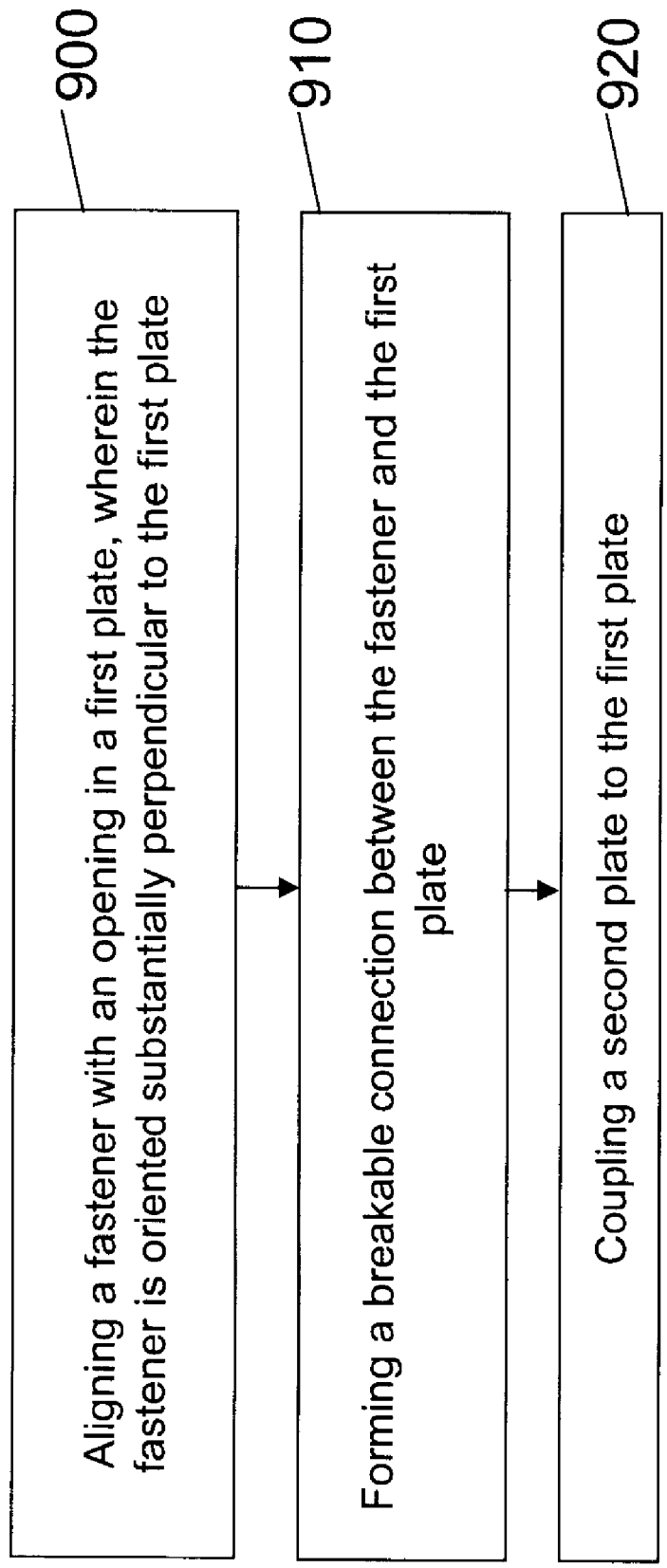
FIG. 9 describes a method for breakably connecting fasteners to a construction connector.
Like reference symbols indicate like elements throughout the specification and drawings.

FIG. 9 describes a method for breakably connecting fasteners to a construction connector. A fastener is aligned with an opening in a first plate, wherein the fastener is oriented substantially perpendicular to the first plate (900). A breakable connection between the fastener and the first plate can be formed (920). A second plate can be coupled to the first plate (930).

A number of implementations have been disclosed herein. Nevertheless, it will be understood that various modifications may be made without departing from the spirit and scope of the claims. Accordingly, other implementations are within the scope of the following claims.

What is claimed is:

1. An apparatus, comprising: a first plate and a second plate, wherein at least the first plate has a plurality of openings and is angled with respect to the second plate; at least one nail aligned with a corresponding opening in the first plate and fixedly oriented substantially perpendicular to the first plate; and a rigid welded breakable connection coupling the at least one nail to the first plate substantially at the end of the at least one nail.

2. The apparatus of claim 1, wherein the first plate and the second plate comprise separate pieces.

3. The apparatus of claim 1, wherein the first plate and the second plate comprise a unitary piece of material.

4. The apparatus of claim 1, wherein the second plate is aligned substantially perpendicular to the first plate.

5. The apparatus of claim 1, wherein the second plate is flexibly coupled to the first plate.

6. The apparatus of claim 1, further comprising: a second nail, wherein the second nail is aligned with an opening in the second plate and oriented substantially perpendicular to the second plate; and a rigid welded breakable connection coupling the second nail to the second plate.

7. The apparatus of claim 1, further comprising: a second nail, wherein the second nail is aligned with an opening in the second plate and fixedly oriented at an angle of between 30 degrees to 60 degrees to the second plate; and a rigid welded breakable connection coupling the second nail to the second plate.

8. The apparatus of claim 1, further comprising: a second nail aligned with a second corresponding opening in the first plate and oriented substantially perpendicular to the first plate; and a rigid welded breakable connection coupling the second nail to the first plate.

9. The apparatus of claim 1, wherein the first plate comprises:
one of a metal, a plastic, graphite, or a composite.

10. The apparatus of claim 1, wherein at least one of the plurality of openings comprises a beveled opening.

11. The apparatus of claim 1, wherein the first plate further comprises:
a construction connector.

12. An apparatus, comprising: a first plate and a second plate, wherein at least the first plate has a plurality of openings and is angled with respect to the second plate; at least one nail aligned with a corresponding opening in the first plate and fixedly oriented substantially perpendicular to the first plate; and a direct welded metal-to-metal breakable connection coupling the at least one nail to the first plate substantially at the end of the at least one nail.

13. The apparatus of claim 12, wherein the first plate and the second plate comprise separate pieces.

14. The apparatus of claim 12, wherein the first plate and the second plate comprise a unitary piece of material.

15. The apparatus of claim 12, further comprising: a second nail, wherein the second nail is aligned with an opening in the second plate and oriented substantially perpendicular to the second plate; and a direct welded metal-to-metal breakable connection coupling the second nail to the second plate.

16. The apparatus of claim 12, further comprising: a second nail, wherein the second nail is aligned with an opening in the second plate and fixedly oriented at an angle of between 30 degrees to 60 degrees to the second plate; and a direct welded metal-to-metal breakable connection coupling the second nail to the second plate.

17. The apparatus of claim 12, wherein at least one of the plurality of openings comprises a beveled opening.

* * * * *